United States Patent [19]

Kirkpatrick

[11] 3,737,913

[45] June 5, 1973

[54] MULTIPLE CHANNEL DRY-PROCESS FILM RECORDER

[75] Inventor: Burnard M. Kirkpatrick, Dallas, Tex.

[73] Assignee: Teledyne Industries Inc. (Geotech Division), Dallas, Tex.

[22] Filed: June 9, 1971

[21] Appl. No.: 151,210

[52] U.S. Cl. ......................346/34, 95/89 R, 219/216, 346/108

[51] Int. Cl. ..............................................G01d 9/36

[58] Field of Search......................346/108, 110, 109, 346/34; 95/89 R, 14, 13; 219/216; 331/94.5 P

[56] References Cited

UNITED STATES PATENTS

| | | | |
|---|---|---|---|
| 3,199,049 | 8/1965 | Morse et al. | 331/94.5 P |
| 3,224,355 | 12/1965 | Thomiszer | 355/106 |
| 3,334,353 | 8/1967 | Everest | 346/76 L |
| 3,389,403 | 6/1968 | Cottingham et al. | 346/108 |
| 3,401,398 | 9/1968 | Lichtenstein | 346/107 |
| 3,449,755 | 6/1969 | Samodai et al. | 346/108 X |
| 3,482,229 | 12/1969 | Burr | 340/174.1 |
| 3,488,659 | 1/1970 | Brunn et al. | 346/108 X |

*Primary Examiner*—Joseph W. Hartary
*Attorney*—Alexander & Dowell

[57] ABSTRACT

A recorder for recording on a sensitized medium multiple side-by-side traces representing input signals at plural separate input terminals, the system being illustrated by a typical embodiment in which a laser beam is focused to write upon a dry process film which is heat developed by passing the film over heaters which are servo-controlled to maintain constant surface temperature, the film being longitudinally advanced past a recording zone in which the laser beam spot is cyclically scanned transversely of the film in synchronism with a ramp signal, the multiple traces representing the various input signals all being mutually offset transversely of the film by adding progressively increasing constant pedestal voltages to the various input signals to create composite signals which are mutually stepped to successively higher voltage levels, these voltage levels being compared for coincidence with the rising voltage of the ramp signal during each transverse scan of the laser beam spot which is shuttered "on" to mark the film each time coincidence is found.

8 Claims, 3 Drawing Figures

Fig. I

INVENTOR
BURNARD M. KIRKPATRICK
BY
Alexander E. Dowell
ATTORNEYS

INVENTOR.
BURNARD M. KIRKPATRICK
BY
Alexander & Dowell
ATTORNEYS

MULTIPLE CHANNEL DRY-PROCESS FILM RECORDER

This invention relates to optical recorders in which a light beam records analog traces upon a sensitized surface, and more particularly relates to improvements in recorders of the above type in which a single light-beam is used to simultaneously record multiple analog traces on a longitudinally advancing sensitized strip medium such that the individual traces are mutually offset from one-another transversely across the width of the medium.

The invention herein described was made in the course of or under contract or subcontract thereunder with the United States Air Force.

It is a principal object of the invention to provide an improved recorder capable of recording and developing traces in multiple channels on a dry process film, and at the same time employing high writing speeds. The use of a dry process film is particularly desirable for several reasons. One reason lies in the fact that it can be heat-developed without delay to provide almost immediate access to the record traces being recorded thereon, thereby omitting the waiting involved in wet processing. Another important advantage resides in the simplicity and trouble-free nature of dry process developing, i.e., resulting from the elimination of continuous automatic wet processing mechanisms, of chemical solutions which tend to corrode and etch vital mechanical and optical components, and of high maintenance and downtime. However, wet process films have the advantage that they are more sensitive and can be used effectively with much lower light intensities than dry process films, and can therefore be used with ordinary light sources even where the light from a source has been further divided into plural beams for simultaneous multiple-channel recording.

The present invention provides a recorder capable of using commercially available dry process films such as DRY SILVER FILM as produced by the 3M Company, or as described in U.S. Pat. No. 3,152,903 issued on Oct. 13, 1964. The use of such dry process film has been made possible by the availability of the laser as a high-intensity source of light which can be focused into a very concentrated diffraction-limited spot having high intensity capable of recording at high writing speeds as has been recognized in the prior art, for instance in U.S. Pat. No. 3,154,371 dated Oct. 27, 1964, in U.S. Pat. No. 3,465,347 dated Sept. 2, 1969, and in U.S. Pat. No. 3,474,459 dated Oct. 21, 1969. The latter patent also suggests multiple-channel recording using a laser beam, but dividing its total energy into plural separate beams, each recording a different trace.

It is a major object of this invention to provide an improved recorder system in which a large number of adjacent channels are simultaneously recorded contiguously across the width of the sensitized medium by a single laser beam whose energy is not divided but instead remains unified and concentrated in a single flying spot whose high intensity permits it to successfully write on dry process film, not only in multiple channels but also at satisfactory high writing speeds. Naturally, it is recognized that the present recorder system can also be used to write on a variety of other sensitive strip media, such as on wet process silver halide films, or on other dry process films such as Kalfax and Kalvar films produced by the Kalvar Corporation.

Another major object of the invention is to provide a multiple channel recorder including a system for automatically and continuously developing and fixing a dry-process film, which film is first preheated to a temperature below its developing temperature, is then exposed to the laser beam to record a trace thereon, and is finally heated again to a carefully controlled degree to develop the latent image substantially immediately.

Still a further and more specific object of the invention is to provide improved means for advancing and tensioning the film longitudinally, for deflecting the laser beam transversely across the width of the film, for modulating the laser beam as it is deflected so as to write components of the various traces in each of the operative recording channels during each transverse beam deflection, and for maintaining these functions mutually synchronized while also continuously developing the film and displaying the traces recorded thereon.

Another object of the invention is to provide an improved recorder capable of high data-packing densities, but having simplified structures as compared with the structure of a wet-process recorder of similar capability.

Other objects and advantages of the invention will become apparent during the following discussion of the drawings, wherein.

Figure 1:
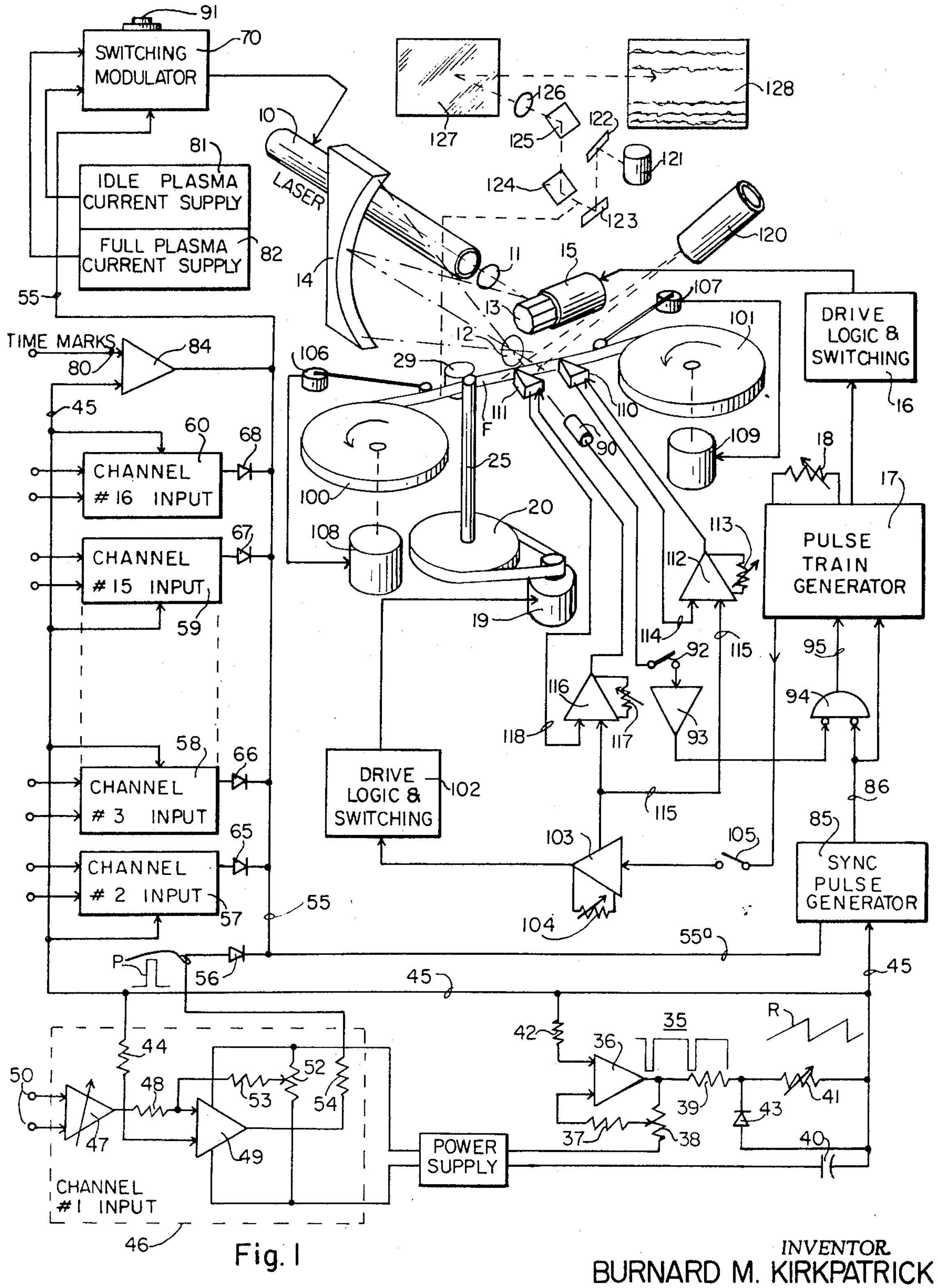
FIG. 1 is a schematic diagram showing a preferred embodiment of the invention.

The drawings describe a typical illustrative embodiment of the invention which includes a laser 10 delivering a high-intensity beam which is focused on the surface of the photo-sensitive film F. The laser 10 is preferably a continuous-wave gas laser capable of delivering a beam of light having sufficient intensity when focused to expose dry process film at high writing speeds. The coherent nature of laser-beam light permits it to be focused to an extremely small spot diameter whereby the energy in the beam is concentrated to provide both a very high writing power density and a very fine-trace line permitting high-data-packing densities on the film. A gas laser also provides a very satisfactory operational life, for instance somewhere in the range of 1,500 to 4,000 hours, such extended life making installations possible where the equipment is unattended for long periods of time as might be required at a remote seismic array. The beam from the laser is focused by suitable lenses 11 and 12 and is deflected transversely of the film by a rotating multi-faceted mirror 13 which reflects the beam onto a narrow concave mirror surface 14 from which the beam is directed toward the surface of the film F. The faceted mirror 13 is rotated in a manner to be hereinafter described by a motor 15 and, as the facets rotate, the beam scans uni-directionally across the transverse width of the film F. In view of the essentially monochromatic nature of the laser beam, chromatic abberations in the lens element can be neglected and only spherical abberations need be considered. There are several ways of treating the latter in order to obtain very fine focusing of the spot, one such way is to arrange the system such that the central ray of the beam always passes virtually through the optical center of the lenses whereby a constant spot diameter is obtained. Since a laser beam is inherently collimated, condensing mirrors or lenses are not required in view of the fact that all radiated energy is readily intercepted by the optical elements. Moreover, all of its energy is conserved so that very high power densities are obtained in spot diameters which can be achieved in a practical manner, whereby the selected laser need only have modest power output.

The position of the focused spot as it deflects transversely across the width of the film F is determined at any particular instant by the angular position of the particular facet of the rotating mirror 13 which is currently reflecting the laser beam toward the concave mirror 14. In view of the fact that the intensity of the laser beam is gated on and off in order to provide increments in each of the analog traces in the various signal channels during each sweep of the beam as it is deflected across the width of the film F, it is accordingly necessary to synchronize the deflection of the beam with some type of sampling of the signal amplitude levels. For this reason, a stepping motor 15 is particularly useful as a means for rotating the mirror facets because of the fact that its velocity and the positions of the mirror facets which it rotates can be controlled with great accuracy. The stepping motor, however, is not operated in a discrete-step fashion, but rather it is operated near the upper limit of its slewing range whereat the motor rotation is just barely able to keep up with the rate at which input pulses are supplied to it. In order to make the rotation of the motor, and therefore of the mirror 13, uniform rather than step-wise due to the pulsating nature of the energizing signal, the moment-of-inertia of the motor armature and of the mirror 13 is selected to provide a flywheel effect, and in addition the internal resonance of the motor and its electronic drive system is controlled. In addition, the degree of mechanical damping of the system is carefully controlled. As a result of properly matching the motor with the electronic drive circuitry 16, which comprises suitable logic circuitry and solid-state switching, a practical system is obtained in which the mirror 13 rotates at substantially constant velocity.

As will be explained hereinafter in greater detail the rotation is synchronized with externally generated signals, and means is provided whereby the phase position of the rotating mirror facets with respect to said signals can be selected and properly maintained. The stepping motor 15 used in the practical embodiment of the present invention has eight phase windings, and their drive is such that the motor steps through one increment for each input pulse to the logic circuitry 16 which effectively controls the eight phases in sequence. A train of input pulses is generated by the pulse train generator 17 whose average output pulse rate is adjusted by properly setting the potentiometer 18 whereby the average rotational rate of the faceted mirror 13 is controlled. This rate of course controls the deflection velocity of the spot across the transverse width of the film F as a function of the setting of the potentiometer 18. A further discussion of the transverse scanning including the accomplishment of both the desired scan velocity and the mirror phase synchronization appears hereinafter.

In the practical working embodiment of the system the stepping motor 15 has eight phase windings providing a stepping angle of 3°45′ at a maximum pull-out rate of 7,500 steps per second, the term pull-out rate referring to the maximum rate at which the stepping motor can follow pulses without losing step. There would thus be 360°/3°45′ = 96 steps per revolution of the rotor at 78.125 revolutions per second or 4,687.5 revolutions per minute. The multi-faceted mirror 13 is octagonal, and therefore, eight transverse deflections or scans across the film F will be completed per revolution, thereby providing 78.125 × 8 = 625 scans per second, or 0.0016 seconds per scan. Also, 96/8 = 12 steps, or input pulses, will be required per scan. These figures are of course arbitrarily selected to illustrate one satisfactory working embodiment of the invention and will be referred to subsequently during discussion of the specification.

Figure 2:
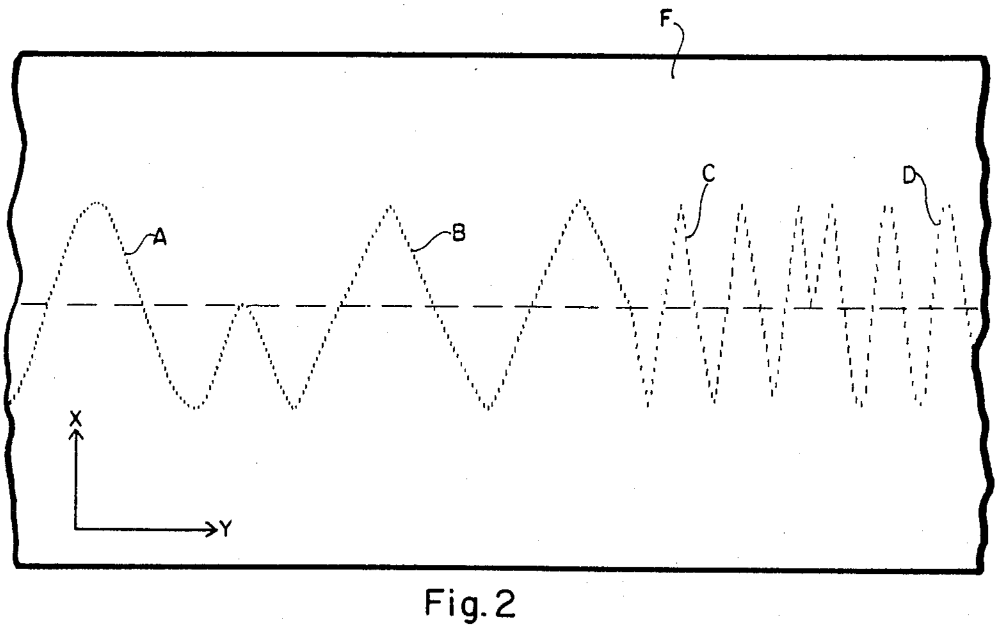
FIG. 2 is a graphical illustration of the manner in which a trace is recorded on a sensitized surface during successive deflections of the laser beam.
Figure 3:
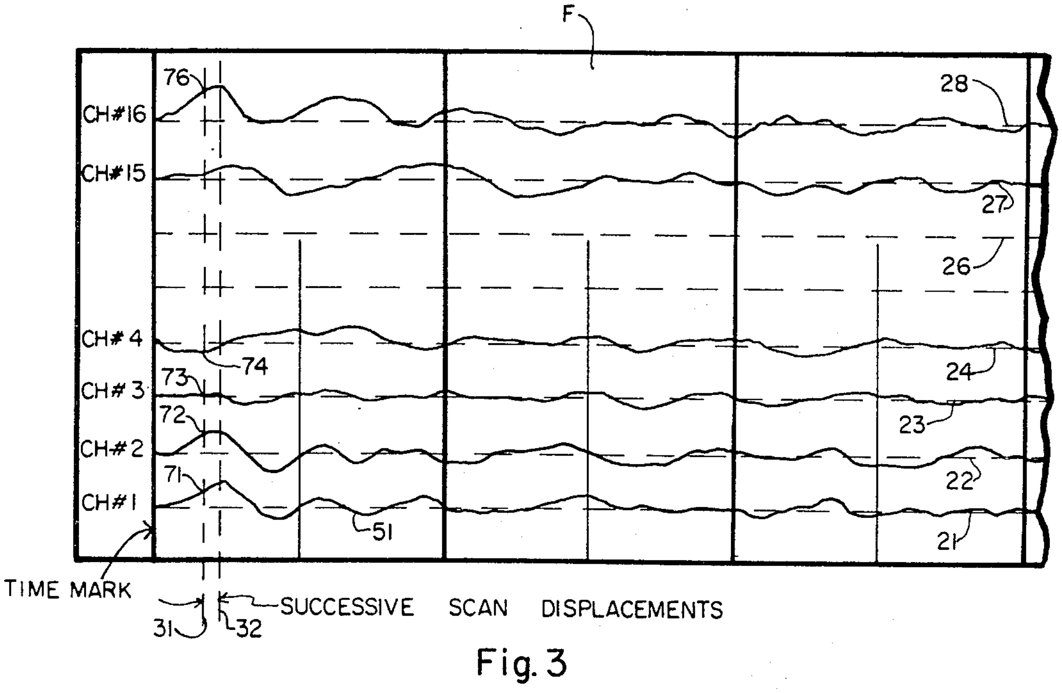
FIG. 3 is an illustration of multiple signal traces recorded on a film strip in transversely offset relationship.

The present system records a graphical representation of each one of multiple input analog signals to provide a display of the type shown in FIGS. 2 and 3. FIG. 2 shows a trace labelled A which is a sine wave of low frequency, a trace B which is a triangular waveform of the same frequency, a trace C which is a triangular waveform of similar amplitude but more than three times the frequency of trace B, and a trace D which is a sine wave of the same higher frequency as is shown in trace C. All of these waveforms have been recorded during successive displacements of the laser spot in the X direction and during longitudinal movements of the film F in the Y direction. Longitudinal translation of the film in a manner to be discussed hereinafter is accomplished by the motor 19 shown in FIG. 1.

During displacement in the X direction as a result of rotation of each facet of the mirror 13, the light spot scans from the bottom of the film F toward the top of it. As is about to be explained, a ramp voltage R whose waveform is shown near the bottom of FIG. 1 is also increased from its minimum level, and steps are taken to make the spot scan in the X direction synchronously with the increase of the ramp voltage. The ramp voltage as it increases is then compared with the instantaneous voltage level of the incoming analog signal in each channel, and when the two become coincident with regard to level the laser beam is momentarily keyed on so that a spot is recorded on the film F at that instant. The composite of the spot positions made during successive transverse spot displacements or scans results in waveform traces such as those shown in FIG. 2.

The present invention includes a system for using a single unified flying light-spot resulting from unified focusing of the laser beam to record multiple channel traces, the present practical embodiment of the system including sixteen individual channels occupying contiguous areas and having separate channel inputs as shown to the left in FIG. 1. Although effort is made to offset the traces into different adjacent areas, "overlining" can occur among adjacent traces especially where the gains of input amplifiers are set high. The transverse separation of the various longitudinal channel areas on the film is accomplished by adding a different dc pedestal voltage to each of the analog input signals and sequentially graduating the various pedestal voltages to provide increasing offset levels, for example to achieve zero axis offsets as shown in FIG. 3 and respectively labelled 21, 22, 23, 24 . . . 26, 27, and 28. As many offset levels can be provided to transversely separate as many channel areas on the film as desired within the capability of the packing density of the system in view of the available width of the film F and the fineness of the recorded traces. The particular recording area in which a signal is recorded can be arbitrarily chosen by selecting the value of its dc pedestal voltage, and it is therefore not necessary that the signals be recorded on the film in the numbered sequence of the input channels.

During each transverse displacement of the spot across the width of the film F the level of the pedestal voltage plus the signal analog level in the same channel will provide non-interferring progressively higher spot marks on the film as can be seen by starting at the bottom of FIG. 3 and following the vertical line 31 upwardly as it crosses the various channel signals. If the film is transported longitudinally at a constant velocity past the transverse scanning zone of the optical system the signal channels will all be repeatedly sampled and a multiple trace record will be made of the individual amplitudes over a period of time, thereby resulting in dotted images whose composite reproduces the analog waveforms of the signals in the various channels. The film F can either be advanced in the longitudinal direction at a constant rate in which case the lines 31 and 32 will be displaced slightly from vertical orientation in FIG. 3, or alternatively the film can be moved in incremental steps taking place between each of the successive scans, in which event the lines 31 and 32 would be truly vertical. The former continuous-motion approach is more practical.

The traces A, B, C, and D shown in FIG. 2 are copies of an actual record made by analog signals in a signal channel. Trace A is the record of a sine wave voltage that was sampled about 60 times per cycle of the waveform. The same is true of the triangular waveform B which has the same frequency and was sampled at the same rate. The waveform of trace C is about three and one-half times as high a frequency as the traces A and B and therefore was sampled only about 17 times per cycle of the waveform. Likewise, trace D is a sine wave of the same frequency as trace C and was also sampled about 17 times per cycle of its waveform. The velocity of scanning of the spot across the film F in the X direction was the same for all four traces shown in FIG. 2. Since each analog signal is sampled only once per scan of the spot in the X direction it is apparent from FIG. 2 that the lower frequency signals shown in traces A and B are recorded in much better detail than the two higher frequency signals shown in traces C and D. For instance, trace C is not so readily distinguishable from trace D as shown in FIG. 2 because of the general lack of detail, whereas the two waveforms A and B appear to be easily distinguishable, one from the other. It is therefore essential in a practical system that it be able to sample the highest frequency of interest enough times per cycle to permit reliable interpretation of the resulting record. For instance, as viewed in FIG. 2 it would appear that about 30 samples per cycle of the highest frequency to be recorded would about define a minimum practical beam-deflection rate.

As pointed out above, in the practical embodiment of the present system each scan occupies about 0.0016 seconds and this is conveniently accomplished using an 8 phase stepping motor 15 and an 8 facet mirror 13. Since each analog signal is sampled only once per scan, 0.0016 seconds is also the time between successive scan displacements in the Y direction, for instance the spacing between the scan path lines 31 and 32 located at the bottom of FIG. 3. If one assumes that for seismic purposes an upper frequency of 20 Hz is the maximum frequency of interest, then each cycle of this frequency lasts for 0.05 seconds, and accordingly samplings would be accomplished at the rate of 0.05/0.0016 = 31.25 times per cycle of said maximum frequency. Thus, each cycle would be scanned at least 31 times.

As briefly mentioned above, a ramp signal R shown near the bottom of FIG. 1 is generated to provide a linear reference voltage with which the vertical displacement of the flying spot is synchronized each time it is deflected transversely across the film F in the X direction by the mirror 13. For this purpose, a ramp function generator is provided which bears the reference character 35 in FIG. 1 and includes an amplifier 36 having one input connected to a resistor 37 with a potentiometer 38 connected to a suitable voltage source. When the amplifier 36 oscillates its output comprises a series of positive going pulses which are coupled through a resistor 39 to charge a capacitor 40 through a potentiometer 41 whose setting adjusts the charging rate. Feedback from the capacitor 40 is applied through a resistor 42 to the other input of the amplifier 36 to cause it to oscillate. Oscillation results in linear charging of capacitor 40 during positive cycles and discharging thereof through the diode 43 during negative cycles to provide the linear ramp waveform R. The output of the ramp generator 35 is applied to a wire 45 which is connected to each one of the input channel modules 46, 57, 58 . . . 59 and 60 as a reference voltage for the purpose hereinafter stated.

Each of the channel input modules is like the others and the input module 46 for channel No. 1 is typical of them all. This input channel includes a pair of differential input terminals 50 driving an amplifier 47 whose gain is adjustable to adjust the overall amplitude of the recorded waveform, for instance, as shown at 51 in FIG. 3 and representing the analog signal for channel No. 1. The output of this amplifier 47 is coupled through an isolation resistor 48 to a second amplifier 49. The amplifier 49 is connected between opposite terminals of a power supply (not shown) so that the potentiometer 52 is connected across the power supply and applies an adjustable voltage through the resistor 53 to the same input of the amplifier 49 to which the amplifier 47 is connected. Thus, the input on the upper terminal of the amplifier 49 is the analog signal arriving through resistor 48 summed with the dc adjusted pedestal voltage arriving through resistors 53 from the potentiometer 52. On the other hand, the lower input to the amplifier 49 comprises the ramp voltage R taken through a resistor 44 from the wire 45, and when this ramp voltage level equals the input level at the upper terminal of the amplifier 49, the amplifier conducts and delivers to the bus wire 55 a positive pulse signal P arriving through the resistor 54 and the diode 56.

It is important to note that each of the other channel inputs including the channel No. 2 input circuit 57, the channel No. 3 input circuit 58, . . . the channel No. 15 input circuit 59, and the channel No. 16 input circuit 60 has a similar dc pedestal offset potentiometer corresponding with potentiometer 52 but differently set so as to provide a different adjustable pedestal level graduated in the upward direction for each channel. The dc pedestal voltage for channel No. 1 is set at the level 21 in FIG. 3 and this level is set by the potentiometer 52 in the input module 46. Likewise, the input module 57 sets the offset level 22 and so on up through the module 60 for input channel No. 16 which likewise sets the pedestal level 28 shown in FIG. 3. Thus, as the ramp voltage increases synchronously with vertical displacement of the spot in the X direction across the width of the film, the time at which each channel input module delivers a coincidence pulse to the bus wire 55 through its diode is progressively later. The pulse following the pulse P from channel No. 1 but generated in channel No. 2 is delivered to the bus wire 55 by way of the diode 65. Channel No. 3 delivers its pulse through the diode 66; . . . channel No. 15 delivers its pulse through the diode 67; and channel No. 16 delivers its pulse through the diode 68, last of all. As pointed out above, it is not necessary that the trace positions on the film follow the numbered input amplifier succession because trace positions can be interchanged by appropriately setting their respective pedestal offset voltages.

Whenever the voltage of the ramp waveform R on wire 45 crosses the composite signal plus pedestal voltage in a given channel, the input module for that channel delivers a pulse P on the bus wire 55, and this pulse is used to enable a power-supply switching modulator 70. The switching modulator 70 will be described hereinafter in greater detail, but at the moment it suffices to say that the modulator 70 turns "on" the laser beam whenever a coincidence pulse P is delivered on the wire 55 from any channel. As the ramp voltage increases from zero toward its maximum level, FIG. 3, it first encounters coincidence with the voltage level 71 in the lower left-hand corner, this level comprising the sum of the pedestal voltage 21 applied by the potentiometer 52 plus the instantaneous level of the signal voltage 51. The signal voltage 51 can either add to or subtract from the pedestal voltage 21, and the gain of the amplifier 47 can be preset either so that the amplitude of the maximum signal voltage 21 cannot interfere with the channel No. 2 permissible amplitude swing, likewise comprising the combination of its instantaneous signal level as shown at 72 added to its pedestal voltage 22, or else the amplifiers can have their gains set higher to permit a certain amount of trace "overlining." In the latter case there will not be electrical channel interference since the channels are isolated by their diodes coupling them to bus wire 55. Thus, as the ramp voltage increases it will progressively find coincidence at the levels 71 and 72, and at the level 73 representing channel No. 3, the level 74 representing channel No. 4, and so on through all of the channels until it eventually reaches the level 76 at channel No. 16. If all 16 channels have signal inputs, and are in use, there will be 16 points of coincidence as the ramp voltage R increases to its maximum value. In any signal channel in which the analog signal is momentarily zero, coincidence will be obtained as the ramp voltage R passes the pedestal offset voltage for that particular channel. If the signal level remains zero in that channel, then as the film advances longitudinally, there will result a straight line succession of spots on the record located at the level of the pedestal voltage which has been set in that channel by the potentiometer which corresponds with the potentiometer 52 of input channel No. 1.

The number of channels which can be recorded on a film of given width as a practical matter is determined among other factors by the recording spot diameter and the amplitudes of the signal traces in the various channels. In the practical embodiment of the present disclosure there are 16 such channels, and the equipment is built so that channels may be added or subtracted merely by plugging them in to make contact with the bus wire 55 and the ramp signal wire 45, as well as the necessary power supply terminals.

The laser beam is modulated by the source switching modulator 70 to shutter the beam on or off by controlling its plasma current. The laser beam is shuttered off by reducing the plasma current until the power output of the laser 10 falls below the level required to expose the film. This amount of current is referred to herein as the idle plasma current and is provided by a regulated current source 81 which continuously supplies idle current to the laser 10 from the source switching modulator 70 whenever no pulse P is present on the wire 55, meaning that there is no coincidence between the signal voltage in any channel and the ramp signal. However, when coincidence occurs and a pulse P appears on bus 55 the laser 10 is then shuttered "on" for the duration of the pulse P in order to provide a dot on the waveform being recorded on film F, for instance such as one of the dots comprising the waveforms of FIG. 2. The laser is shuttered "on" by increasing its plasma current to the full output level, and this involves switching to the full plasma current power source 82 as a result of a pulse P having been delivered on wire 55 to the current source switching modulator 70. A blanking pulse appears on wire **55*a*** during the return trace of the ramp waveform R to prevent the undesirable recording of spots on the film F as the level of the ramp signal returns to its lowest level.

In addition, a time mark circuit is provided which includes the amplifier 84 for the purpose of recording timing marks on the film F. For instance, such a timing mark might comprise the up-hole jug signal of a seismic array whose outputs are being recorded in the various signal channels. Other such timing marks might include horological marks in terms of seconds or minutes. In any event, the timing marks are entered from an external source (not shown) at the timing mark input terminal 80 and applied to the amplifier 84 whose output is delivered to the modulator control wire 55. The time marks are preferably recorded across the entire width of the film by applying the output of the time mark generator 84 together with one or more cycles of the ramp signal delivered to the amplifier 84 on the wire 45. In order to make the time mark lines readily distinguishable from other traces, these lines can be made of greater weight by modulating the laser beam "on" for plural successive scans. Another way to provide time marks is to turn the beam "on" only for a sufficient time to have it pass part-way across the transverse width of the film F, the lengths of the time marks being coded in this fashion to indicate different time intervals, or other distinguishing features.

Considering the fact that the ramp voltage scans upwardly across the whole possible range of signal levels which are entered into the various channels and offset by adding a modifying pedestal voltage to each, and considering the fact that the laser beam is simultaneously scanned transversely across the width of the film F to record those levels, it follows that the ramp voltage R and the scanning mirror 13 must be mutually synchronized in order to obtain proper placement of the resulting traces on the film strip. There are various ways in which synchronism of the ramp voltage with the scanning motion of the mirror facets can be obtained, these means including both mechanical-optical means for creating the ramp voltage in step with the mirror motion as well as electronic means for synchronizing an independently generated ramp voltage with the rotation of the motor 15. The present system uses the latter approach for synchronizing the rotation of the mirror 13 with the independently generated ramp voltage waveform R generated in the generator 35. It is possible to determine the beginning of each of its ramp cycles by detecting the trailing edge of the saw tooth. For this purpose, the ramp waveform wire 45 is connected to a synchronizing pulse generator 85 which detects the trailing edge of the saw tooth waveform R and generates a trigger pulse on wire 86, which trigger pulse is then delivered to the pulse train generator 17. Each time the generator 17 is actuated by a trigger pulse via wire 86, the pulse train generator delivers a train including a constant number of pulses to the stepping motor electronic drive logic and solid state switching circuitry 16 which drives the various motor phase windings successively such that the facets of the octagonal mirror are caused to scan the laser beam across the film synchronously with the increasing ramp voltage. A new facet of the mirror 13 is brought into operation and sweeps the beam across the film F for each ramp voltage cycle.

As mentioned above, although the motor 15 is a stepping motor, it is rotated near its maximum slewing range and does not actually operate with a step-by-step motion even though the voltages applied to its phase winding are pulse voltages. The stepping motor is therefore kept in step with the ramp signal R by keeping the trains of pulses from the generator 17 precisely in step with the ramp signal. Each time the ramp signal R returns to its minimum value, a new trigger pulse from sync pulse generator 85 appears, causing the pulse train generator 17 to deliver the first pulse in the next train of pulses just as the ramp signal begins its increase. The generator 85 also causes a new blanking pulse to appear on the wire **55*a* which lasts for the duration of the ramp signal's return trace. As the ramp signal increases positively towards its maximum value the remaining pulses of the train are generated by the pulse train generator 17 and delivered to the driving circuitry 16. If the pulse train generating rate of the generator 17 is correct, the pulses in successive trains will all be evenly spaced not only within the same train but also at the transitions therebetween. The present practical system uses twelve pulses per generated train. By proper adjustment of the potentiometer 18 the spacings between all pulses generated by the generator 17 can be made substantially uniform so that the motor 15** rotates at a smooth constant rate.

As the motor 15 rotates in response to these trains of pulses the beginnings of each of the successive trains of pulses are subject to minor corrections as to position according to the moment at which the trigger pulse appears on wire 86 in order to actuate the pulse train generator 17 to begin its next train of pulses. Since the system is stable, only very minor corrections in the positions of the successive trains of 12 pulses are necessary in order to maintain exact synchronization between the facets of the mirror 13 and successive cycles of the ramp waveform R.

Although rate synchronization between the ramp function R and the stepping motor 15 is maintained in this way when once achieved, it is initially necessary to somehow achieve phase synchronization whereby each mirror facet will begin scanning the spot across the width of the film at the very moment when the ramp function R commences its rise. In the absence of phase synchronization it is probable that the mirror would rotate at the correct scanning rate but would not have the spot commence scanning at the correct point near the bottom of the film. For this purpose, a separate start-up system is used in order to achieve the proper position of the rotating mirror with respect to the ramp function R when the system is initially started up. In order to determine the effective position of the mirror facets 13 a photodetector 90 is located opposite a point low on the film F where the scanning laser beam will impinge upon it at the beginning of each new scan. The "start-up" circuit is rendered operative by push button switches 91 and 92 which are ganged together. When actuated these push switches turn "on" the laser beam so that "start-up" synchronization can be achieved and also connect the photodetector 90 to the amplifier 93, which puts out a pulse each time the laser beam begins a new scan. When the system is first placed in operation, the stepping motor 15 accelerates into running step with the ramp function, but is not necessarily in positional synchronism with its beginning. In order to attain such positional synchronism the pulses delivered from the amplifier 93, and occurring at the beginning of each scan are delivered to a NAND gate 94 which also receives the sync pulses from the wire 86 applied to trigger the pulse train generator 17. If the pulses from the amplifier 93 and from the generator 85 occur simultaneously, the NAND gate 94 issues no output on the wire 95 because the faceted mirror 13 is already in positional synchronism. However, if the pulses from the amplifier 93 do not arrive simultaneously with the trigger pulses on the wire 86, the NAND gate 94 puts out a "reset" pulse on wire 95 which causes the train of pulses from the generator 17 to abort and remain dormant until the next train is initiated by a trigger pulse on wire 86. The stepping motor 15 thus does not receive a full train of pulses, and as a result the motor loses some of its steps. This lagging of the motor 15 soon brings it into synchronism wherein the pulses arrive simultaneously at the NAND gate 94 and therefore provide no outputs on the "reset" wire 95, whereupon the operator releases the push button switches 91 and 92.

The film F is advanced by the stepping motor 19 which belt-drives a pulley 20 coupled to rotate a capstan 25 which drives the film F against a roller 29. The film is supplied from the reel 101 and taken up by a reel 100 in the manner well known per se in recording systems. The stepping motor 19 is driven by electronic drive means 102 which comprises suitable logic circuitry and solid state switching and is in turn driven by a pulse generator 103 which normally counts out pulses at a constant rate. The rate at which its pulses are generated is determined by the setting of a potentiometer 104, this rate therefore determining the rate of longitudinal advance of the film F. This rate can be either manually controlled, or else the film advance velocity can be slaved to the rate of transverse film scanning displacement by closing the switch 105, as a result of which the generator 103 will deliver pulses to the drive circuit 102 at a rate which is related to the pulse rate of generator 17, typically as a submultiple thereof.

The tension of the film as it progresses from the supply reel 101 to the take up reel 100 is continuously controlled by two other stepping motors respectively labelled 108 and 109. These motors supply enough torque to control the tension of the film, and this torque is determined by a pair of tension sensor amplifiers 106 and 107 which deliver torque pulses of reversible polarity to the stepping motors 108 and 109 respectively to either increase or decrease the film tension.

There are two heaters shown in FIG. 1 which are used in the developing of the dry process film. The heater 110 is used to pre-emphasize the film by initially heating it to a temperature below its developing temperature before it is exposed to the beam spot focused by the lens 12. This pre-heating allows the film to be developed in a shorter period of time after its exposure to the flying spot from the laser 10. After such exposure, the heater 111 is used to actually develop the film. Both heaters comprise heated surfaces over which the film is drawn respectively before and after exposure to the laser beam, and in addition each heater also contains a thermistor by which its temperature is continuously monitored so that its heat is continuously servo-controlled. The resistance heating element in heater 110 is driven by output from the amplifier 112 which can be adjusted by changing the setting of the potentiometer 113. The temperature of the heating unit 110 is sensed by a built-in thermistor (not shown) which delivers feedback on wire 114 to the amplifier 112. The other input to the amplifier 112 arrives on wire 115 and comes from the film drive pulse generator 103, whereby input on wire 115 can be used to indicate to the heater the velocity of the film so as to compensate its temperature for changes in film advance rate. In a similar way, the heating element within the heater unit 111 is driven by output from the amplifier 116, controlled by the potentiometer 117 to set its average level. Feedback from a thermistor (not shown) in the heater unit 111 delivers input on the wire 118 to the amplifier 116, and information concerning the velocity of the film advance is taken from the wire 115 to drive the other input to the amplifier 116, thereby making its output control the temperature to a constant level despite variations in the rate of longitudinal advance of the film.

A microscope 120 can be provided with which to view the traces on the film either as they are being exposed by the travelling dot of the laser beam or else after developing by the final heating unit 111. Moreover, in the practical working model of the present disclosure, there is a convenient viewer added to the system for showing the recorded and developed traces on a ground glass screen mounted on the front of the instrument cabinet. This viewer includes a light source 121 delivering a directed light beam to a mirror 122 by which the beam is reflected downwardly to another mirror 123 by which the beam is directed horizontally. The beam passes through the film F between the mirror 123 and an upwardly directed mirror 124, which then passes the image of the recorded traces on to a mirror 125 directed to pass the light through a lens system 126 which focuses the image through another mirror 127 onto a ground glass plate 128 which comprises a front facing screen on the cabinet housing the recording system.

This invention has been described and illustrated with reference to a practical working embodiment, but the invention is not to be limited thereto since variations are contemplated within the scope of the following claims, wherein:

1. A multiple trace recorder for recording analog input signal deflections in adjacent tracks across the width of a heat-developable sensitive strip medium longitudinally advancing through a writing zone, comprising in combination:

a. a laser for delivering a beam of light for writing latent images on said medium representing said signals;

b. optical means for focusing said beam into a spot on the medium at said writing zone, and further including means for periodically scanning said spot across the width of the strip medium;

c. stepping motor means for longitudinally advancing the strip medium and including an electronic drive circuit comprising means for generating motor-stepping pulses at a rate which determines the rate of longitudinal advance of the strip medium;

d. means for generating a periodic ramp function voltage synchronized with said periodic spot scanning means to commence and increase in step therewith;

e. means for comparing instantaneous input signal levels with the instantaneous level of said ramp voltage and for delivering a pulse whenever coincidence occurs;

f. means for modulating said laser beam to an intensity sufficient to write latent images on said strip medium in response to said coincidence pulses;

g. heater means operatively associated with said strip medium for developing said latent images, and including means for sensing its own temperature and delivering an output representative thereof; and h. heater control means comprising dual-input amplifier means connected to control the flow of power to the heater means, one amplifier input being coupled to said sensing means output and the other amplifier input being coupled to said electronic drive circuit to receive output therefrom proportional to the rate of said motor-stepping pulses.

2. In a recording system as set forth in claim 1, multiple discrete input signal means, each having terminals to receive a different analog signal and each connected to receive said ramp function voltage, means in each discrete input signal means for adding a pedestal voltage to the local input signal, each of the pedestal voltages being adjustable over a full range sufficient to offset its latent image to any width-position on the strip medium and these pedestal voltages being normally adjusted to progressively different levels as between the various input signal means to offset the composite summed-pedestal-plus-signal voltages by different amounts, said comparing means being associated respectively with each of the input signal means and successively delivering coincidence pulses corresponding with each thereof, whereby increments of multiple traces are recorded in mutually adjacent orientation across the width of the strip medium as the spot is deflected thereacross.

3. In a system as set forth in claim 2, said means for generating a periodic ramp function generating a sawtooth waveform having a return trace; and means for controlling said modulating means to lower said intensity below the level required to write images during each return trace.

4. In a system as set forth in claim 1, power supply means for supplying plasma current to the laser; and said modulating means comprising means for increasing the plasma current in response to each coincidence pulse from a normally existing idle plasma current level sufficient only to provide a laser beam having an intensity less than that required for writing on the sensitized medium, to a full plasma current level providing an intense laser beam sufficient to write a latent image.

5. In a system as set forth in claim 4, said sensitive strip comprising a dry-process film and said heater means comprising at least two spaced heaters operatively associated with the film and respectively disposed on opposite sides of the writing zone, both heaters having said means for sensing their own temperatures and having dual-input amplifier means coupled to the sensing means and to said output proportional to the rate of motor stepping pulses, and their amplifier means being connected to control the flow of power to their associated heater means.

6. In a system as set forth in claim 1, said optical means for periodically deflecting the spot comprising a rotating multi-faceted mirror driven by a stepping motor, the facets of the mirror intersecting the laser beam one at a time and deflecting it across the strip medium, said means for generating a ramp function including means for adjusting its period to substantially equal the duration of each spot deflection; means for deriving from said ramp function synchronizing pulses locked to its periods; pulse train generator means operative when actuated to generate a train of pulses which includes the number of pulses required to drive the stepping motor to turn a mirror facet through one complete spot deflection; and means responsive to said synchronizing pulses to actuate the pulse train generator.

7. In a system as set forth in claim 6, means responsive to the focused laser beam spot to detect its position at the beginning of each deflection thereof, said means for deriving a synchronizing pulse from the ramp function deriving said pulse marking the beginning of each period thereof, and means responsive to failure of the beginning of said deflection to coincide with the beginning of a ramp function period to alter the number of pulses in each generated train until said beginnings coincide.

8. In a system as set forth in claim 7, said means to control the rate of the drive pulse generating means including means for receiving said synchronizing pulses and triggering the drive pulse generating means in response thereto.

* * * * *